(12) United States Patent
Muneto et al.

(10) Patent No.: US 12,064,881 B2
(45) Date of Patent: Aug. 20, 2024

(54) ROBOT CONTROLLING DEVICE

(71) Applicant: Kawasaki Jukogyo Kabushiki Kaisha, Kobe (JP)

(72) Inventors: Koji Muneto, Kobe (JP); Atsushi Kameyama, Kakogawa (JP)

(73) Assignee: KAWASAKI JUKOGYO KABUSHIKI KAISHA, Kobe (JP)

(*) Notice: Subject to any disclaimer, the term of this patent is extended or adjusted under 35 U.S.C. 154(b) by 439 days.

(21) Appl. No.: 17/190,415

(22) Filed: Mar. 3, 2021

(65) Prior Publication Data

US 2021/0187743 A1 Jun. 24, 2021

Related U.S. Application Data

(63) Continuation of application No. PCT/JP2019/032157, filed on Aug. 16, 2019.

(30) Foreign Application Priority Data

Sep. 3, 2018 (JP) .................. 2018-164762

(51) Int. Cl.
*B25J 9/16* (2006.01)
*B25J 13/08* (2006.01)

(52) U.S. Cl.
CPC .......... *B25J 9/1674* (2013.01); *B25J 9/1651* (2013.01); *B25J 13/085* (2013.01); *B25J 13/088* (2013.01)

(58) Field of Classification Search
CPC ........ B25J 9/1651; B25J 13/088; B25J 9/043; B25J 9/1676; B25J 9/1674; B25J 9/1682; B25J 13/085; G05B 2219/39109; G05B 2219/40201; G05B 2219/40202
See application file for complete search history.

(56) References Cited

U.S. PATENT DOCUMENTS

| | | | | |
|---|---|---|---|---|
| 10,035,267 | B2* | 7/2018 | Matthias | B25J 9/1676 |
| 2008/0188985 | A1* | 8/2008 | Sakano | B25J 9/1648 901/32 |
| 2009/0248037 | A1* | 10/2009 | Prisco | A61B 34/71 606/130 |
| 2011/0066282 | A1* | 3/2011 | Bosscher | B25J 9/1676 700/255 |
| 2016/0272354 | A1* | 9/2016 | Nammoto | B25J 13/085 |
| 2017/0113349 | A1* | 4/2017 | Naitou | B25J 13/085 |
| 2017/0189126 | A1* | 7/2017 | Weir | A61B 34/25 |
| 2017/0225331 | A1* | 8/2017 | Sussman | B25J 9/1676 |

(Continued)

FOREIGN PATENT DOCUMENTS

| | | |
|---|---|---|
| JP | 2012-6132 A | 1/2012 |
| JP | 5370127 B2 | 12/2013 |

(Continued)

*Primary Examiner* — Adam R Mott
*Assistant Examiner* — Sagar KC
(74) *Attorney, Agent, or Firm* — XSENSUS LLP

(57) ABSTRACT

A robot controlling device controls operation of a robot having a first robotic arm and a second robotic arm. The robot controlling device includes a distance calculating module configured to calculate a distance between a tip end of the first robotic arm and a tip end of the second robotic arm, and a distance monitoring module configured to monitor whether the distance calculated by the distance calculating module is equal to or less than a predetermined value.

14 Claims, 8 Drawing Sheets

(56) References Cited

U.S. PATENT DOCUMENTS

| | | | |
|---|---|---|---|
| 2017/0274523 A1* | 9/2017 | Sato | B25J 9/1651 |
| 2017/0357242 A1* | 12/2017 | Watanabe | B25J 9/1666 |
| 2018/0049830 A1* | 2/2018 | Yates | A61B 34/35 |
| 2018/0093378 A1* | 4/2018 | Yamamoto | B25J 13/085 |
| 2018/0232593 A1* | 8/2018 | Tani | F16P 3/142 |
| 2018/0361578 A1 | 12/2018 | Muneto | |
| 2019/0118387 A1* | 4/2019 | Morita | E04H 6/18 |
| 2019/0160668 A1* | 5/2019 | Oyama | B25J 13/084 |
| 2020/0016766 A1* | 1/2020 | Katsuhisa | B25J 9/1674 |

FOREIGN PATENT DOCUMENTS

| | | | | |
|---|---|---|---|---|
| JP | 2017-77608 A | 4/2017 | | |
| JP | 2017-177321 A | 10/2017 | | |
| WO | WO-2016103308 A1 * | 6/2016 | | B25J 19/06 |
| WO | 2017/094240 A1 | 6/2017 | | |

\* cited by examiner

ROBOT CONTROLLING DEVICE

CROSS-REFERENCE TO RELATED APPLICATIONS

The present application claims priority to PCT/JP2019/032157, filed Aug. 16, 2019, which claims priority from Japanese Application No. 2018-164762, filed Sep. 3, 2018, the entire contents of each are incorporated herein by its reference.

TECHNICAL FIELD

The present disclosure relates to a controlling device for a robot which works while existing in the same workspace as a human.

BACKGROUND ART

In recent years, a robot and a worker are proposed to work cooperatively in the same workspace in order to improve productivity. Therefore, conventionally, technologies for monitoring safety of a robot working with a robot in the same workspace are developed.

For example, Patent Document 1 discloses a safety monitoring device for a robot, which monitors safety of the robot by monitoring an external force. A controlling device sets a predetermined range within an operating range of the robot, and changes a determining condition of the external force depending on whether the current position of the robot is inside or outside the predetermined range. If the external force satisfies the determining condition, the controlling device stops the robot. Moreover, if the current position of the robot is within the predetermined range, the controlling device regulates an upper limit of a moving speed of the robot to a predetermined speed.

Patent Document 2 discloses an interference avoiding device for a robot. A robot controlling device calculates a distance between a tip end of a flange and a human, and determines whether the tip end of the flange moves toward the human. If the robot controlling device determines that the tip end of the flange moves toward the human, the robot controlling device decelerates or emergently stops the object which requires caution (the tip end of the flange) according to the separating distance.

REFERENCE DOCUMENTS OF CONVENTIONAL ART

Patent Documents

[Patent Document 1] JP2017-077608A
[Patent Document 2] JP5370127B2

SUMMARY

A robot controlling device according to one aspect of the present disclosure controls operation of a robot having a first robotic arm and a second robotic arm. The controlling device includes a distance calculating module configured to calculate a distance between a tip end of the first robotic arm and a tip end of the second robotic arm, and a distance monitoring module configured to monitor whether the distance calculated by the distance calculating module is equal to or less than a predetermined value.

For example, when the dual-arm robot and a worker work cooperatively in the same workspace, the two robotic arms can operate independently from or associating with each other. Depending on the work content, a gap between the tip ends of the two arms becomes narrower and the worker therearound may be caught therebetween. According to this configuration, since whether an obstacle (e.g., the worker) therearound may be caught (pinched) between the tip ends of the two arms or not can be monitored, the controlling device suitable for the robot which works cooperatively with a human can be provided.

The robot controlling device may control operations of the first robotic arm and the second robotic arm so that an operating speed of each of the first robotic arm and the second robotic arm is inhibited to exceed a predetermined speed, when the distance calculated by the distance calculating module is equal to or less than the predetermined value.

For example, when the dual-arm robot and the worker work cooperatively in the same workspace, although a workability improves by increasing the operating speed of the robotic arms, the safety of the worker may not be secured. On the other hand, although the safety of the worker can be secured when the operating speed of the robotic arms decreases, the workability may decrease. Thus, the workability of the robot and the safety of the worker have a trade-off relationship. According to this configuration, when there is a possibility that the obstacle therearound is caught between the tip ends of the two arms, the operations of the arms are controlled so that the operating speed thereof is inhibited to exceed the predetermined speed. On the other hand, when there is a possibility that the object therearound is caught between the tip ends of the two arms, the controlling device can operate the arms as fast as possible. Therefore, for example, even when the worker therearound is caught between the tip ends of the two arms, the links thereof do not collide with the worker at a high speed. Therefore, both of the workability of the robot and the safety of the worker can be achieved.

The robot controlling device may further include a speed monitoring module configured to monitor whether the operating speeds of the first robotic arm and the second robotic arm exceed the predetermined speed, when the distance calculated by the distance calculating module is equal to or less than the predetermined value. The robot controlling device may stop the operations of the first robotic arm and the second robotic arm when the operating speed exceeds the predetermined speed.

According to this configuration, when there is a possibility that the obstacle therearound is caught between the tip ends of the two arms, if the operating speed exceeds the predetermined speed, the operations of the arms can be stopped. Thus, the safety of the worker can be improved more.

The robot controlling device may further include an external force detecting module configured to detect external forces acting on the tip end of the first robotic arm and the tip end of the second robotic arm, and a force monitoring module configured to detect a collision based on a predetermined monitoring criterion, on the basis of the external forces detected by the external force detecting module, when the distance calculated by the distance calculating module is equal to or less than the predetermined value. When the collision is detected, the robot controlling device may stop the operations of the first robotic arm and the second robotic arm.

According to this configuration, when there is a possibility that the object therearound is caught between the tip ends of the two arms, the collision can be detected on the basis of the external forces acting on the tip ends of the two arms, and the operation of the robot can be stopped after the collision is detected. Thus, the safety of the worker can be improved.

The robot controlling device may further include an external force detecting module configured to detect external forces acting on the tip end of the first robotic arm and the tip end of the second robotic arm, and a force monitoring module configured to detect a collision based on a first monitoring criterion, on the basis of the external forces detected by the external force detecting module, when the distance calculated by the distance calculating module is greater than the predetermined value, and detect a collision based on a second monitoring criterion different from the first criterion, on the basis of the external forces detected by the external force detecting module, when the distance calculated by the distance calculating module is equal to or less than the predetermined value. When the collision is detected, the robot controlling device may stop the operations of the first robotic arm and the second robotic arm.

According to this structure, when there is no possibility that the object therearound is caught between the tip ends of the two arms, the collision is detected based on the first monitoring criterion (e.g., at the lower sensitivity to the collision). On the other hand, when the object therearound may be caught between the tip ends of the two arms, the collision is detected based on the second monitoring criterion (e.g., at the higher sensitivity to the collision). That is, since the collision sensitivity can be changed according to the gap between the tip ends of the two arms, both of the workability of the robot and the safety of the worker can be achieved.

Note that, the first robotic arm and the second robotic arm may be provided so as to be rotatable coaxially with and independently from each other.

Note that, the tip end of the first robotic arm may be a tool center point of the first robotic arm, and the tip end of the second robotic arm may be a tool center point of the second robotic arm. The distance calculating module may calculate a distance between the tool center point of the first robotic arm and the tool center point of the second robotic arm.

DESCRIPTION OF EMBODIMENTS

Figure 1:
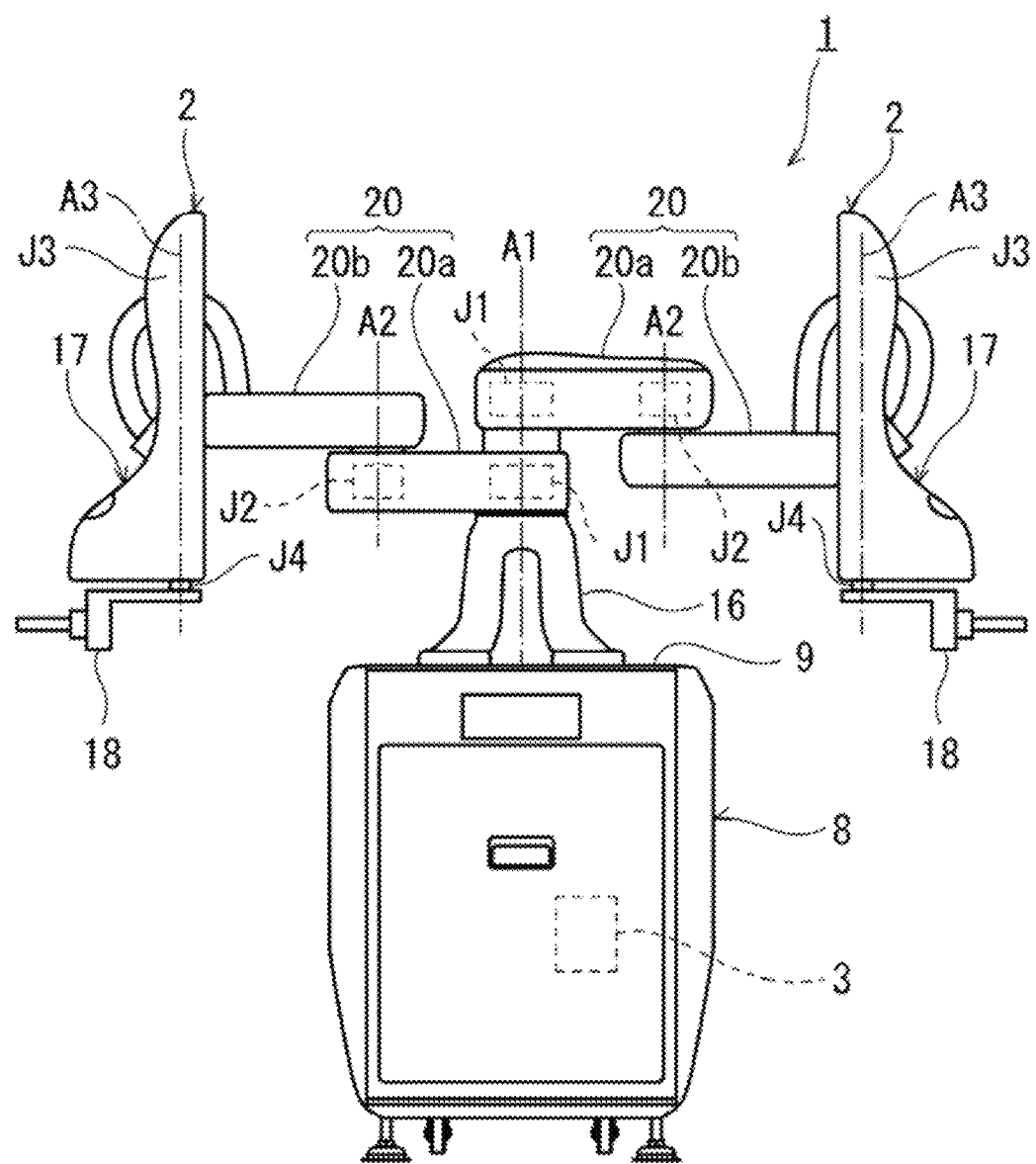
FIG. 1 is a front view schematically illustrating a configuration of a robot according to an exemplary embodiment.
Figure 1:
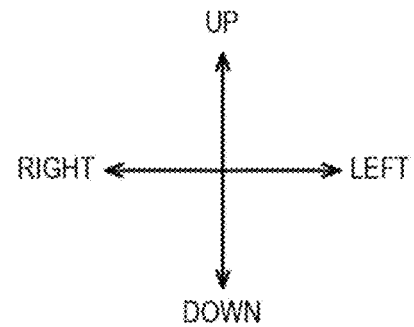

Embodiments of the present disclosure are described with reference to the accompanying drawings. Hereinafter, the same reference characters are given to the same or corresponding components throughout the drawings to omit redundant description.

FIG. 1 is a front view schematically illustrating a configuration of a robot 1 according to an exemplary embodiment. As illustrated in FIG. 1, the robot 1 is provided with a base 9 fixed to a carriage 8, a pair of robotic arms 2 supported by the base 9 (hereinafter, may simply be referred to as "arms"), and a controlling device 3 accommodated in the base 9. The robot 1 of this embodiment is a dual-arm robot having the horizontally articulated arms 2. Below, a direction in which the pair of arms 2 are opened is referred to as a "left-and-right direction," a direction parallel to an axial center of a base shaft 16 is referred to as an "up-and-down direction," and a direction perpendicular to the left-and-right direction and the up-and-down direction is referred to as a "front-and-rear direction." Each of the arms 2 is provided with an arm part 20, a wrist part 17, and an end effector. Note that configurations of the two arms 2 may be substantially the same. Moreover, the two arms 2 can operate independently from or associating with each other. The robot 1 of this exemplary embodiment is, for example, introduced in a production line, and works cooperatively with a worker in the same workspace.

The robot 1 of this exemplary embodiment is a coaxial dual-arm robot. The two arms 2 are disposed coaxially on the base shaft 16 perpendicular to the base 9, and are independently rotatable with respect to the base 9 about a rotational axis A1. In this example, each arm part 20 includes a first link 20a and a second link 20b. The first link 20a is coupled to the base shaft 16, which is fixed to an upper surface of the base 9, via a rotary joint J1 so as to be rotatable about the rotational axis A1 passing through the axial center of the base shaft 16. That is, the rotational axes A1 of the first links 20a of the two arms 2 are on the same straight line, and the first link 20a of one arm 2 and the first link 20a of the other arm 2 are provided with a height difference. The second link 20b is coupled to a tip end of the first link 20a via a rotary joint J2 so as to be rotatable about a rotational axis A2 defined at the tip end of the first link 20a.

The wrist part 17 has a linear-motion joint J3 and a rotary joint J4. The wrist part 17 is ascendable and descendable with respect to the second link 20b by the linear-motion joint J3. The wrist part 17 is rotatable about a rotational axis A3 perpendicular to the second link 20b by the rotary joint J4. A mechanical interface 18 is attached to a tip end of the wrist part 17. The mechanical interface 18 is coupled to a tip end of the second link 20b via the linear-motion joint J3 and the rotary joint J4. The end effector for a task is attached to the mechanical interface 18.

Each of the arms 2 configured as described above has the joints J1 to J4. The joints J1 to J4 are driven by a servo mechanism, for example. The servo mechanism includes a driving part which drives and displaces the arm 2, and a transmission mechanism which outputs a moving force of the driving part to the arm 2. In this exemplary embodiment, for example, the driving part is implemented by servomotors, and each servomotor is provided with a position sensor (e.g., as an encoder) which detects a rotational angular position of the motor. Here, the rotational angular position is an angular position of each joint in a joint coordinate system of the corresponding servomotor. The controlling device 3 controls the positions of the servomotors to control the operations of the left and right arms 2 at an arbitrary speed.

Figure 2:
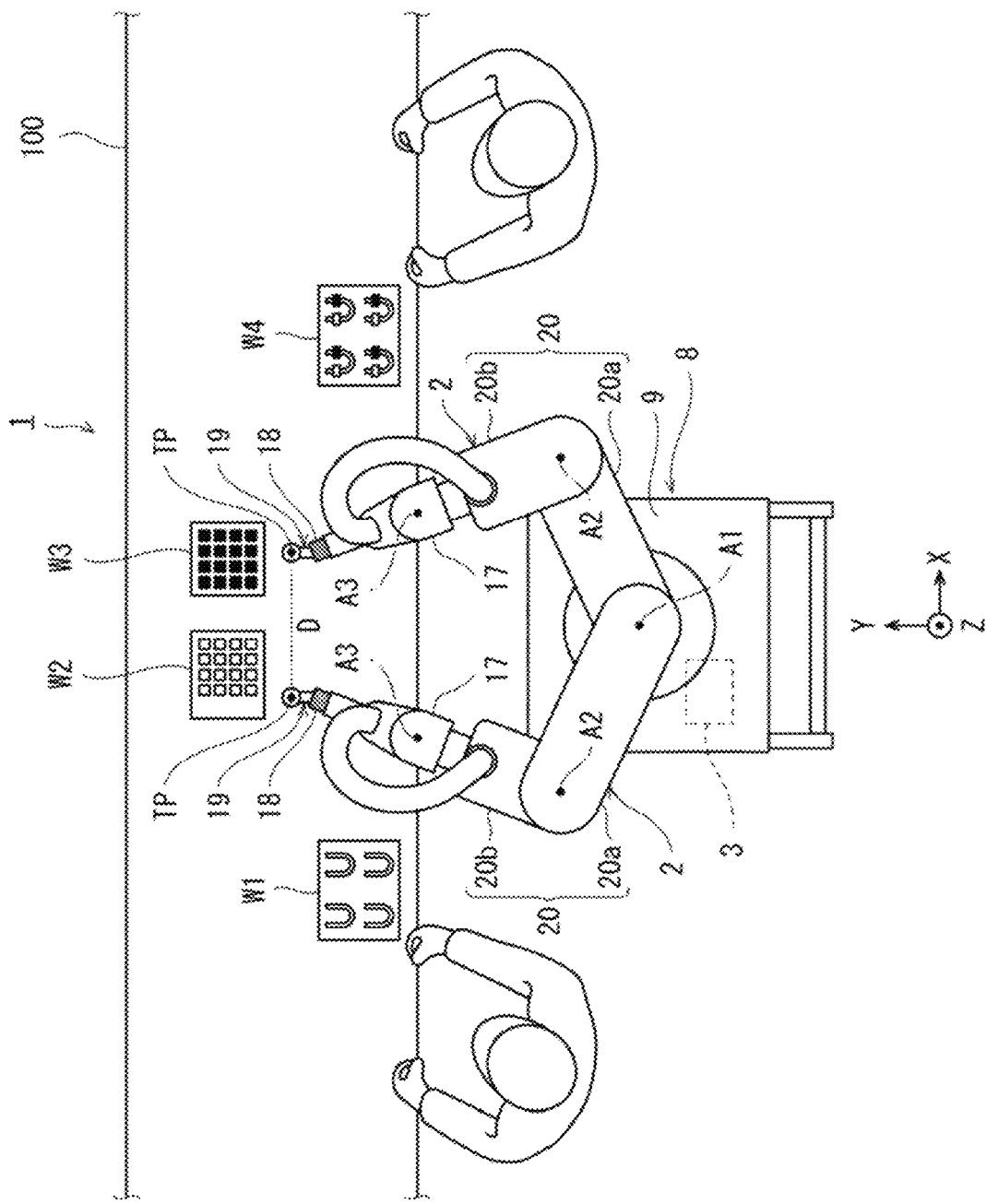
FIG. 2 is a plan view illustrating one example of a work of the robot illustrated in FIG. 1.

FIG. 2 is a plan view illustrating one example of the work of the robot 1 illustrated in FIG. 1. This robot 1 can be installed within a limited space corresponding to a space for one person (e.g., 610 mm×620 mm). As illustrated in FIG. 2, the robot 1 is introduced in the production line, and works cooperatively with the worker in the same line. The robot 1 performs work on a work bench 100 similarly to the worker. End effectors 19 for the work are coupled to the tip ends (the mechanical interfaces 18) of the left and right arms 2 of the robot 1, respectively. A reference character "TP" indicates a tool center point of each end effector 19. In this exemplary embodiment, the left and right end effectors 19 have the same configurations. Areas on the work bench 100 on the left and right sides of a workspace for the robot are workspaces for workers, respectively. In this exemplary embodiment, four types of workpieces W1, W2, W3, and W4 are placed on the workbench 100. The worker on the left side supplies to the robot 1 the workpiece W1 which is a material member. The robot 1 attaches the workpiece W2 which is a first component, and the workpiece W3 which is a second component, to the supplied workpiece W1 so as to finish the workpiece W4. The worker on the right side performs the next processing to the finished workpiece W4.

The robot 1 has a reference coordinate system (hereinafter, referred to as a "base coordinate system"). In this coordinate system, for example, an intersecting point between an installing surface of the base (pedestal) 9 and the rotational axis A1 of the first joint J1 is an origin, the rotational axis of the first joint J1 is a Z-axis, an arbitrary axis perpendicular to the Z-axis is an X-axis, and an axis perpendicular to the Z-axis and the X-axis is a Y-axis. A movable range of each arm 2 of the robot 1 is a circular range centering on the first joint J1. An operating range of each arm 2 is set based on this base coordinate system. In this exemplary embodiment, the operating range is set so as to cover, at least, an area of the work bench 100 which is located in front of the robot 1.

As described above, the two arms 2 can operate independently from or associating with each other when the dual-arm robot 1 works cooperatively with the worker in the same workspace. Depending on the positions and postures of the arms 2, a gap between the tip ends of the respective arms 2 (between the end effectors 19) becomes narrower, and thus, the worker near the robot 1 may be caught between the tip ends of the arms 2.

Figure 3:
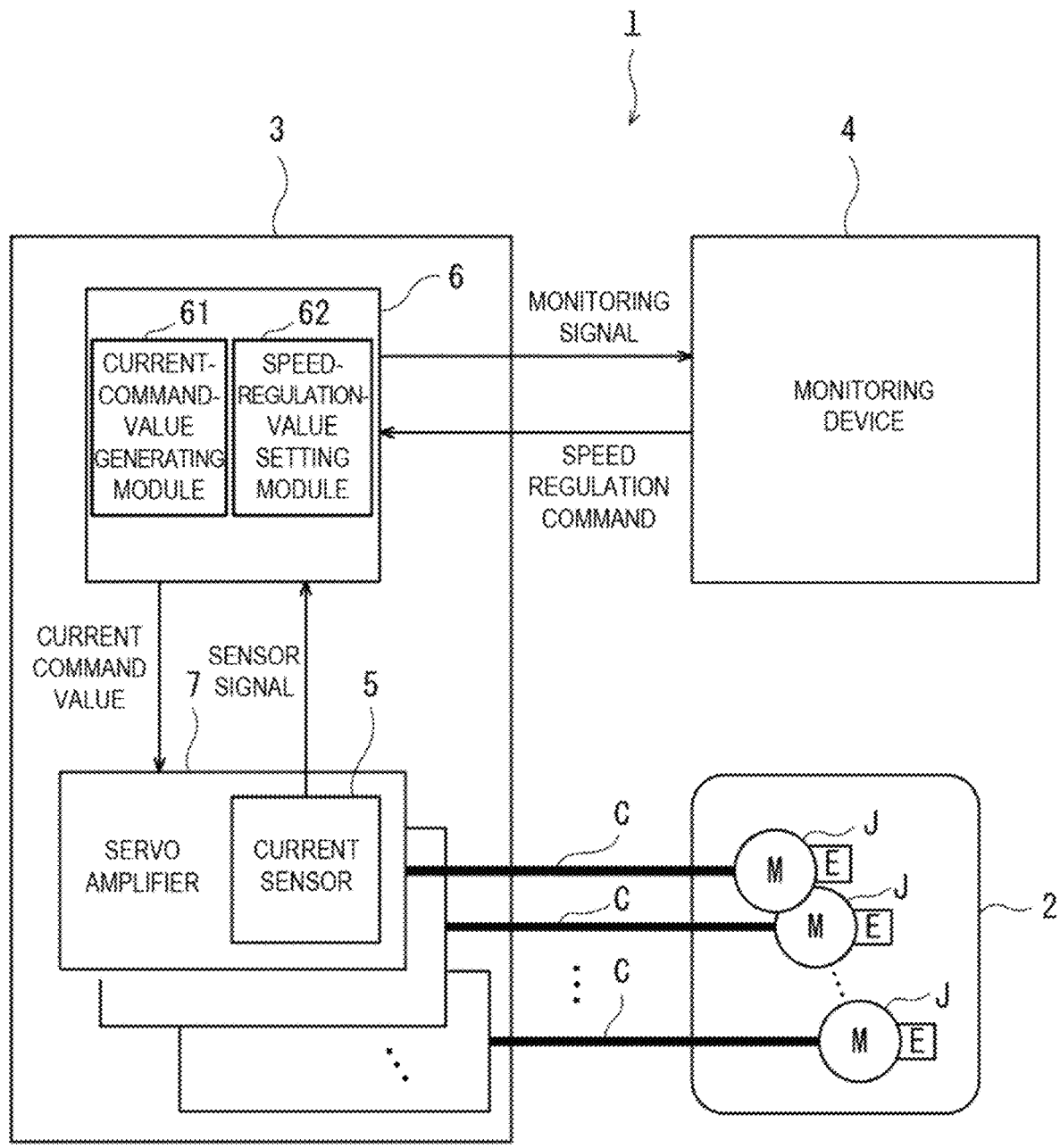
FIG. 3 is a block diagram illustrating the entire configuration of the robot illustrated in FIG. 1.

In this respect, the controlling device 3 of this exemplary embodiment is provided with a monitoring function to monitor the operation of the robot 1 in order to secure the safety of the worker around the robot 1. FIG. 3 is a block diagram illustrating the entire configuration of the robot 1. As illustrated in FIG. 3, the robot 1 is provided with the robotic arms 2, the controlling device 3, and a monitoring device 4. Note that although the robot 1 has two robotic arms 2, only one robotic arm 2 is illustrated for simplification here. The robotic arm 2 is provided with one or more joint(s) J, links coupled therebetween via the corresponding joint, and a driving servomotor M provided to each joint J. A position sensor E (e.g., an encoder) which detects the position of the motor (a rotational angular position of a rotor with respect to a reference rotational angular position), and a current sensor 5 which detects current for driving the motor, are attached to each servomotor M.

The controlling device 3 is connected to the robotic arm 2 via a cable(s) C (illustrated by a bold line). Here, each cable C includes a power line which supplies power to the servomotor M and a brake of the corresponding joint J, and a signal line which receives a sensor signal from the position sensor E attached to the servomotor M. Moreover, the controlling device 3 is connected to the monitoring device 4 via a communication cable. Here, the communication cable is a cable for serial communication (e.g., RS422). In this exemplary embodiment, the controlling device 3 outputs a monitoring signal (a detection signal of the position sensor) to the monitoring device 4, and receives a speed regulation command from the monitoring device 4 via the communication cable. Then, the controlling device 3 changes an operating speed of the robotic arm 2 based on the speed regulation command. Here, the operating speed of the robotic arm 2 means a rotational speed of the servomotor M which constitutes the robotic arm 2 (hereinafter, may be referred to as a "motor speed").

The controlling device 3 is a robot controlling device including a processor 6, a servo amplifier 7, a memory, an input-and-output interface, and a communication interface. The processor 6 is provided with a current-command-value generating module 61 and a speed-regulation-value setting module 62. Here, the current-command-value generating module 61 and the speed-regulation-value setting module 62 are functional blocks implemented by a predetermined program being executed by the processor 6. The current-command-value generating module 61 generates a positional command value of the servomotor M which drives the joint J, based on an operation program of the robot, and generates a speed command value based on the generated positional command value and a detection value (an actual value) of the position sensor. Then, the current-command-value generating module 61 generates a torque command value (a current command value) based on a deviation of the present speed value from the generated speed command value, and outputs it to the servo amplifier 7. The servo amplifier 7 is provided so as to be associated with the servomotor M, and generates current based on the received current command value so as to supply it to the servomotor M via the cable C. That is, the servo amplifier 7 is an amplifier which generates driving current of the servomotor M according to the current command value. The controlling device 3 controls the position of the servomotor M provided to each joint J based on the positional command value, so as to control the operation of the robotic arm 2.

The speed-regulation-value setting module 62 sets a speed regulation value so that the motor speed of the arm 2 does not exceed a predetermined speed, based on the speed regulation command received from the monitoring device 4. In this embodiment, the speed-regulation-value setting module 62 sets the speed regulation value at a first speed (e.g., 800 mm/s) as an initial value. The current-command-value generating module 61 regulates the generated speed command value so as not to exceed the speed regulation value set by the speed-regulation-value setting module 62.

Figure 4:
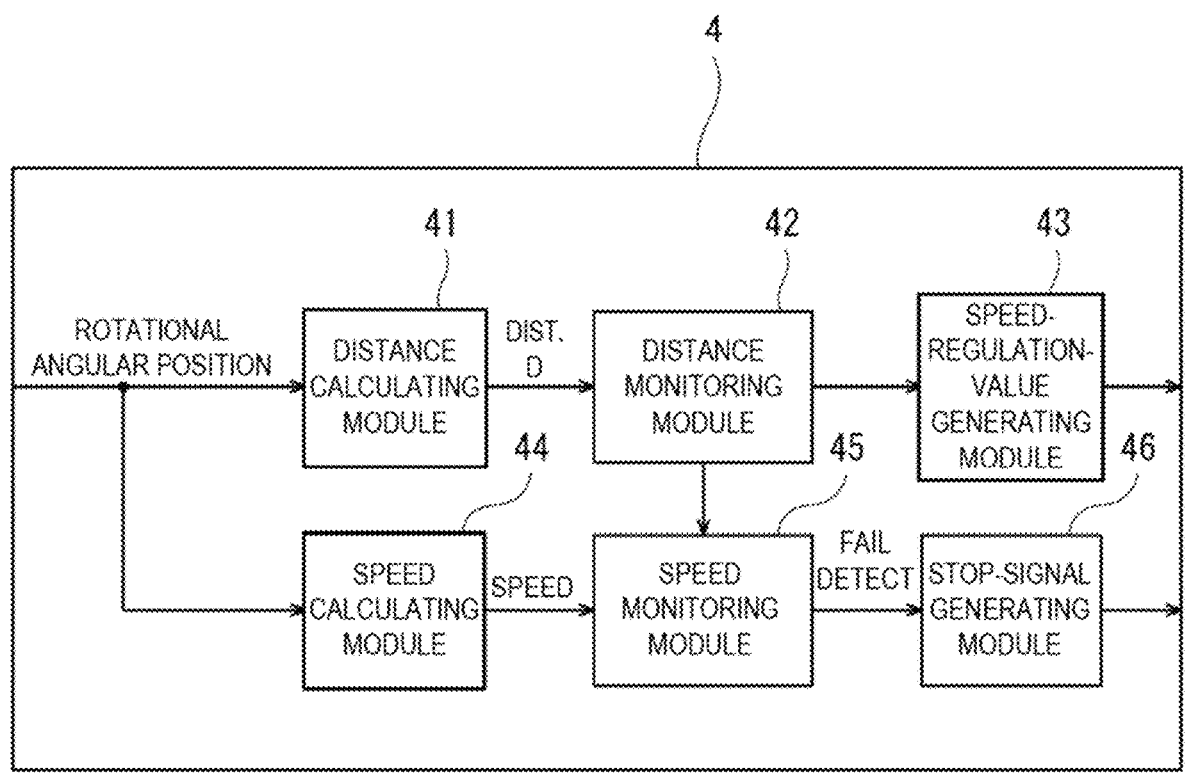
FIG. 4 is a block diagram illustrating a configuration of a monitoring device illustrated in FIG. 3.

FIG. 4 is a block diagram illustrating a configuration of the monitoring device 4 illustrated in FIG. 3. As illustrated in FIG. 4, the monitoring device 4 is provided with a distance calculating module 41, a distance monitoring module 42, a speed-regulation-value generating module 43, a speed calculating module 44, a speed monitoring module 45, and a stop-signal generating module 46. Here, the monitoring device 4 is a computer including one or more processor (s), a memory, an input-and-output interface, and a communication interface. The components 41 to 46 are functional blocks implemented by a predetermined program being executed by the processor. The functionality of the elements disclosed herein including but not limited to the controlling device 3 and the monitoring device 4, 4A may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The distance calculating module 41 calculates a distance D between the tip end of one arm 2 and the tip end of the other arm 2. In this embodiment, the distance calculating module 41 calculates the positions of the tip ends of the arms 2 based on the rotational angular positions of the servomotors M (detection signals of the position sensors E) and information on the lengths and shapes of the links set in advance, respectively, so as to calculate the distance D between the tip ends of the respective arms 2. In this embodiment, the positions of the tip ends of the arms 2 are the tool center points TP of the end effectors 19, respectively (see FIG. 2). The distance calculating module 41 calculates positional coordinates of the respective tool center points TP in the base coordinate system of the robot 1, and calculates the distance D between the tool center points TP of the respective end effectors 19.

The distance monitoring module 42 monitors whether the distance D calculated by the distance calculating module 41 is equal to or less than a predetermined value. Here, the predetermined value is a value at which an obstacle (e.g., the worker) therearound may be caught between the tip ends of the arms 2. In this exemplary embodiment, the predetermined value is set to 10 cm. Note that the monitoring device 4 is provided with an input device with which, for example, an administrator can adjust the value setting of the distance D for monitoring to an arbitrary value. Although in this exemplary embodiment the predetermined value is set to 10 cm, the value may be suitably set according to the situation surrounding the robot 1 and the size of the possible obstacle. The distance monitoring module 42 may generate a three-dimensional model of the robot 1 based on the rotational angular positions of the respective servomotors and the information on the lengths and shapes of the respective links set in advance.

If the distance D is equal to or less than the predetermined value, the speed-regulation-value generating module 43 generates the speed regulation command such that the motor speed of each arm 2 is inhibited to exceed a predetermined speed, and outputs it to the controlling device 3. In this exemplary embodiment, if the distance D is equal to or less than the predetermined value, the speed-regulation-value generating module 43 generates the speed regulation command such that the motor speed of each arm 2 does not exceed a second speed, which is lower than the first speed (the initial value), and outputs it to the controlling device 3.

The speed calculating module 44 calculates the speed of each servomotor M (motor speed) based on the rotational angular position of the servomotor M (the detection signal of the position sensor E). Here, the rotational angular position of each servomotor M included in the monitoring signal is transmitted from the controlling device 3 to the monitoring device 4 via the communication cable, and inputted into the speed calculating module 44. The speed calculating module 44 outputs the calculation result to the speed monitoring module 45.

The speed monitoring module 45 monitors whether the motor speed of each arm 2 exceeds the predetermined speed. In this exemplary embodiment, if the distance D calculated by the distance calculating module 41 is equal to or less than the predetermined value, the speed monitoring module 45 monitors whether the motor speed of any one of the servomotors M provided to the joints J1 to J4 of each robotic arm 2 exceeds the second speed.

If the distance D is equal to or less than the predetermined value and the speed monitoring module 45 determines that the motor speed exceeds the second speed, the stop-signal generating module 46 generates a stop signal of the robot 1, and outputs it to the controlling device 3.

Figure 5:
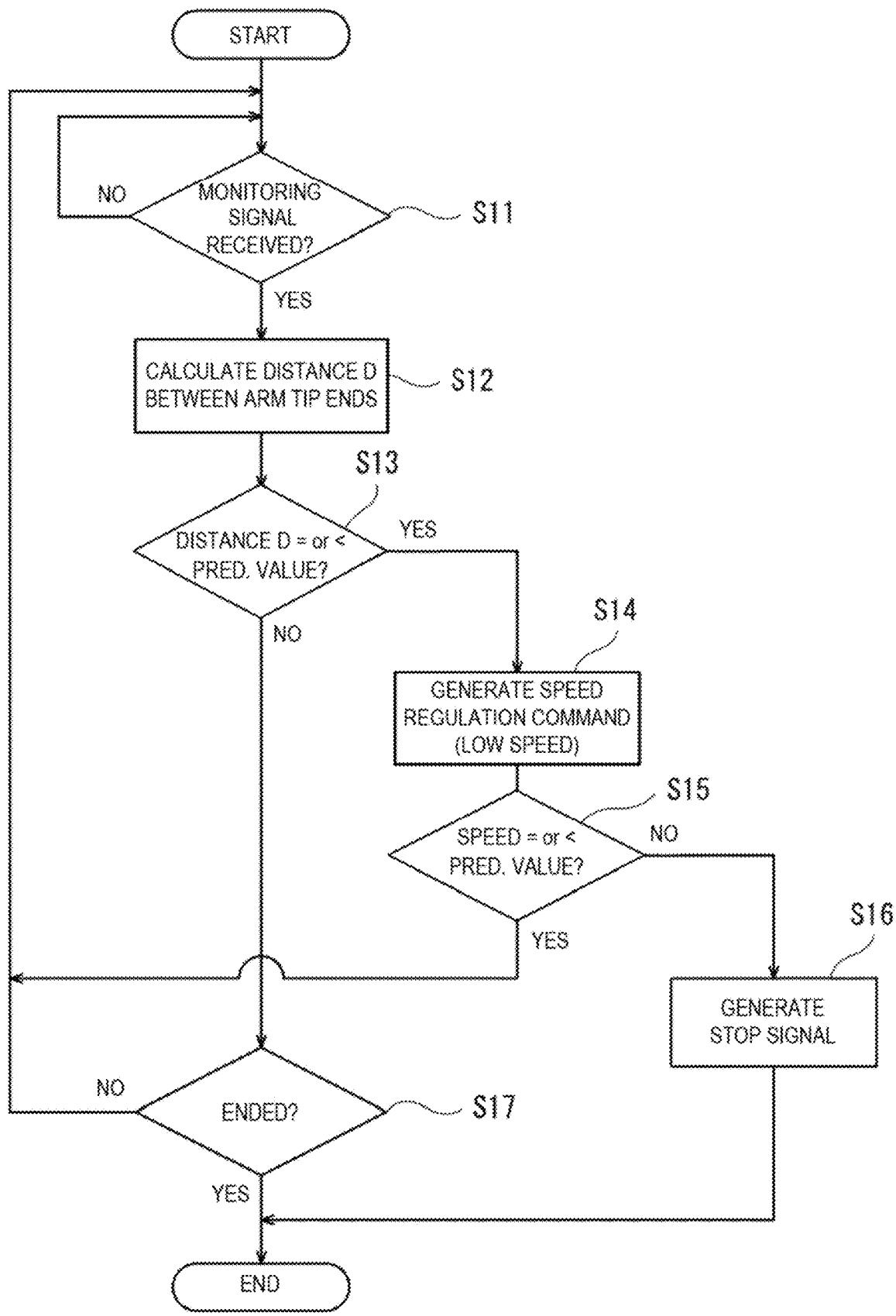
FIG. 5 is a flowchart illustrating one example of a monitoring operation of the robot.

Next, a monitoring operation of the robot 1 by the monitoring device 4 is described with reference to the flowchart in FIG. 5. As illustrated in FIG. 5, first, the monitoring device 4 waits for the input of the monitoring signal transmitted from the controlling device 3 in every predetermined period (Step S11 in FIG. 5). In this exemplary embodiment, the monitoring signal includes the detection signal of the position sensor E provided to each joint J, which is used for the positional control of the robotic arm 2.

Next, when the monitoring device 4 receives the monitoring signal, the distance calculating module 41 calculates the distance D between the tip ends (TP) of the two arms 2 (see FIG. 2) (Step S12 in FIG. 5). The distance calculating module 41 calculates the positions of the tip ends (TP) of the arms 2 based on the rotational angular positions of the servomotors M (the detection signals of the position sensors E) and the information on the lengths and shapes of the links set in advance, respectively, so as to calculate the distance D between the tip ends (TP) of the respective arms 2.

Next, the distance monitoring module 42 monitors whether the distance D calculated by the distance calculating module 41 is equal to or less than the predetermined value (Step S13 in FIG. 5). In this embodiment, if the distance D is equal to or less than 10 cm, the distance monitoring module 42 determines that there is a possibility that the worker therearound may be caught between the tip ends of the arms 2. On the other hand, if the distance D is greater than 10 cm, the distance monitoring module 42 determines that there is no possibility that the worker therearound may be caught between the tip ends of the arms 2.

Next, if the distance monitoring module 42 determines that the worker therearound may be caught between the tip ends of the arms 2 (YES at Step S13 in FIG. 5), the speed-regulation-value generating module 43 generates the speed regulation command such that the motor speed does not exceed the second speed, which is lower than the first speed, and outputs it to the controlling device 3 (Step S14 in FIG. 5). Here, the second speed is 250 mm/s, which is defined as a low speed control in ISO10218-1. The controlling device 3 controls the operation of each arm 2 so that the motor speed does not exceed the second speed. Therefore, even when a part (e.g., a wrist) of the worker near the robot is caught (pinched) between the tip ends of the arms 2, the end effectors 19 do not collide with the part of the worker at a high speed.

Furthermore, in this exemplary embodiment, the speed monitoring module 45 monitors whether the operating speed of each arm 2 exceeds the second speed to which the operating speed is regulated at Step S14 (Step S15 in FIG. 5). In this exemplary embodiment, if the distance D is equal to or less than the predetermined value, the speed monitoring module 45 monitors whether the motor speed of any one of the servomotors M provided to the joints J1-J4 of each arm 2 exceeds the second speed.

Next, if the speed monitoring module 45 determines that the motor speed exceeds the second speed (NO at Step S15 in FIG. 15), the stop-signal generating module 46 generates the stop signal of the robot 1, and outputs it to the controlling device 3 (Step S16 in FIG. 5). The controlling device 3 stops the operation of the robot 1.

On the other hand, if the distance monitoring module 42 determines that there is no possibility that the worker therearound is caught between the tip ends of the arms 2 (NO at Step S13 in FIG. 5), the speed-regulation-value generating module 43 does not generate the speed regulation command. Here, since the initial value of the speed regulation value is set to the first speed (e.g., 800 mm/s), the controlling device 3 controls the operations of the arms 2 at a high speed so that their motor speed do not exceed the first speed. Therefore, ability of the robot 1 can be demonstrated to the maximum. The controlling device 3 repeats the operation described above until the robot 1 ends its work.

Generally, when the robot 1 and the worker work cooperatively in the same workspace as illustrated in FIG. 2, although a workability improves by increasing the operating speed of the arms 2, the safety of the worker may not be secured. On the other hand, although the safety of the worker can be secured when the operating speed of the arms 2 decreases, the workability may decrease. Thus, the workability of the robot 1 and the safety of the worker have a trade-off relationship.

Regarding to this, in this exemplary embodiment, if the distance D between the tip ends of the arms 2 is greater than the predetermined value (NO at Step S13 in FIG. 5), the monitoring device 4 determines that there is no possibility that the worker therearound is caught between the tip ends of the arms 2, and thus, the controlling device 3 operates the arms 2 as fast as possible (at the first speed). On the other hand, if the distance D is equal to or less than the predetermined value, the monitoring device 4 determines that the worker therearound may be caught between the tip ends of the arms 2, and thus, the controlling device 3 operates the arms 2 at a low speed (at the second speed). Therefore, even when a part (e.g., the wrist) of the worker therearound is caught between the tip ends of the robotic arms 2, the end effectors 19 do not collide with the part of the worker at a high speed. Therefore, both of the workability of the robot and the safety of the worker can be achieved.

Moreover, in this embodiment, if the distance D is equal to or less than the predetermined value and the operating speed of the robotic arm 2 exceeds the second speed, the controlling device 3 stops the operation of the robotic arm 2. Therefore, the safety of the worker is further improved. Accordingly, the controlling device 3 suitable for the robot which works cooperatively with the human can be provided.

Next, an exemplary embodiment is described. Below, a configuration common with the above exemplary embodiment is omitted and only a different configuration is described.

Figure 6:
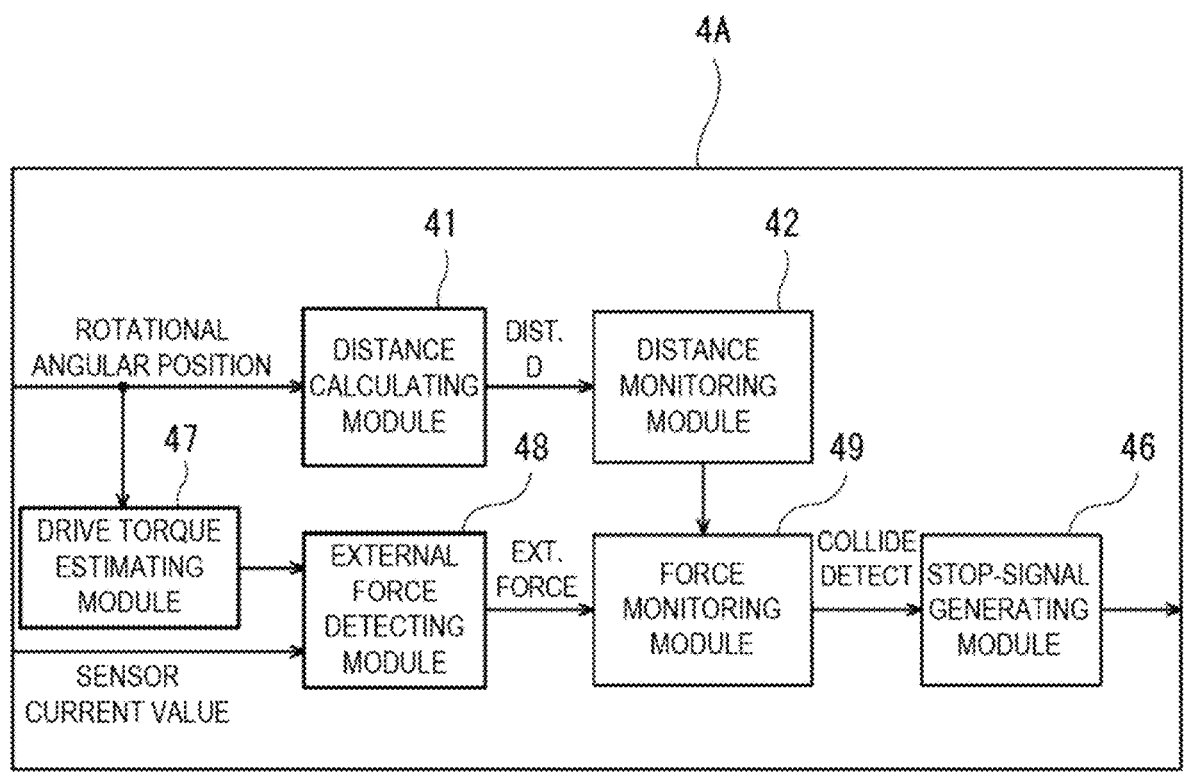
FIG. 6 is a block diagram illustrating a configuration of a monitoring device according to an exemplary embodiment.

FIG. 6 is a block diagram illustrating a configuration of a monitoring device according to this exemplary embodiment. As illustrated in FIG. 6, this embodiment is different from the exemplary embodiment above (FIG. 4) in that a monitoring device 4A includes a drive torque estimating module 47, an external force detecting module 48, and a force monitoring module 49, instead of the speed-regulation-value generating module 43, the speed calculating module 44, and the speed monitoring module 45. The monitoring device 4A of this embodiment has a force monitoring function instead of the speed monitoring function. Therefore, in this exemplary embodiment, the monitoring signal transmitted from the controlling device 3 to the monitoring device 4 includes the detection signal of the position sensor E and a sensor current value detected by the current sensor 5.

The drive torque estimating module 47 estimates a drive torque preferred for driving the servomotor of each joint of the robot 1 based on the rotational angular position calculated by the position sensor E. In this exemplary embodiment, the drive torque estimating module 47 calculates a gravitational torque, an inertial torque, and a friction torque, and adds these torques so as to calculate an estimation value of the drive torque. Here, the gravitational torque is a torque preferred to maintain a posture of each link while resisting the weight of each link. The inertial torque is a torque preferred to resist the inertia of the link. The friction torque is a torque preferred to resist a friction of a reduction gear. Note that although in this exemplary embodiment the drive torque estimating module 47 is implemented by the monitoring device 4, it may be implemented by the controlling device 3. The estimation value of the drive torque may be transmitted from the controlling device 3 to the monitoring device 4 as the monitoring signal, together with the sensor signal including the sensor current value detected by the current sensor 5 and the rotational angular position detected by the position sensor E.

The external force detecting module 48 detects an external force acting on the tip end of each arm 2. In this exemplary embodiment, the external force detecting module 48 converts the sensor current value flowing in each servomotor M, which is detected by the current sensor 5, to a torque value. Then, the external force detecting module 48 calculates a disturbance torque by subtracting the estimation value of the drive torque inputted from the drive torque estimating module 47, from the torque value converted from the sensor current value. The external force detecting module 48 uses this disturbance torque to calculate an external force acting on the tip end of the arm 2, and outputs the calculated external force to the force monitoring module 49. In detail, the external force detecting module 48 calculates an external force $f_d$ acting on the tip end of each arm 2 (TP in FIG. 2) using a disturbance torque $\tau_d$ based on the following Formula (3) in accordance with the principle of virtual work.

$$f_d = (K^T)^{-1} \tau_d \qquad (3)$$

Here, "K" is the Jacobian matrix which represents an infinitesimal displacement relationship between the base coordinate system and the joint coordinate system of the robot 1. In the Jacobian matrix K, a relationship of the following Formula (4) is established between an error $\Delta x$ and a joint angle difference $\Delta \theta$.

$$\Delta x = K \Delta \theta \qquad (4)$$

In this manner, the external force detecting module 48 multiplies the disturbance torque $\tau_d$ by an inverse matrix of a transpose $J^T$ of the Jacobian matrix K based on Formula (3) so as to calculate the external force $f_d$ acting on the tip end of each arm 2. Then, the external force detecting module 48 outputs the calculated external force $f_d$ to the force monitoring module 49. Note that the external force $f_d$ in Formula (3) is an external force when it is assumed to act on the tip end of the robotic arm 2. When the external force $f_d$ acts on a part of the arm 2 other than its tip end, the external force $f_d$ may be transformed in its coordinate to the point where the external force actually acts.

If the distance D (see FIG. 2) calculated by the distance calculating module 41 is greater than the predetermined value, the force monitoring module 49 detects a collision based on a first monitoring criterion on the basis of the external force detected by the external force detecting module 48. In detail, the force monitoring module 49 calculates a value $f'_d$, which is proportional to a derivative of the external force value $f_d$ inputted from the external force detecting module 48, as an impact force acting on the tip end of the robotic arm 2, and determines whether a value of the impact force $|f'_d|$ acting on the tip end of the robotic arm 2 exceeds a first threshold $f_{th1}$ set in advance. If the impact force value $|f'_d|$ exceeds the first threshold $f_{th1}$, the force monitoring module 49 determines that the obstacle collides with the tip end of the robotic arm 2, and thus, generates a collision detection signal and outputs it to the stop-signal generating module 46. The impact force value $|f'_d|$, which is the value compared with the first threshold $f_{th1}$, is a scalar value of the external force $f'_d$. Note that the force monitoring module 49 may detect the collision by determining whether an external force value $|f_d|$ inputted from the external force detecting module 48 exceeds a threshold set in advance. Note that the monitoring device 4 is provided with an input device with which, for example, the administrator can adjust the threshold for detecting the collision to an arbitrary value.

When the stop-signal generating module 46 receives the input of the collision detection signal from the force monitoring module 49, the stop-signal generating module 46 generates the stop signal of the robot 1 and outputs it to the controlling device 3.

Next, the monitoring operation of the robot 1 by the monitoring device 4A is described with reference to the flowchart in FIG. 7. Since operations of the distance calculating module 41 and the distance monitoring module 42 at Steps S21 to S23 in FIG. 7 are the same as the operations at Steps S11 to S13 in FIG. 5, description is omitted.

Figure 7:
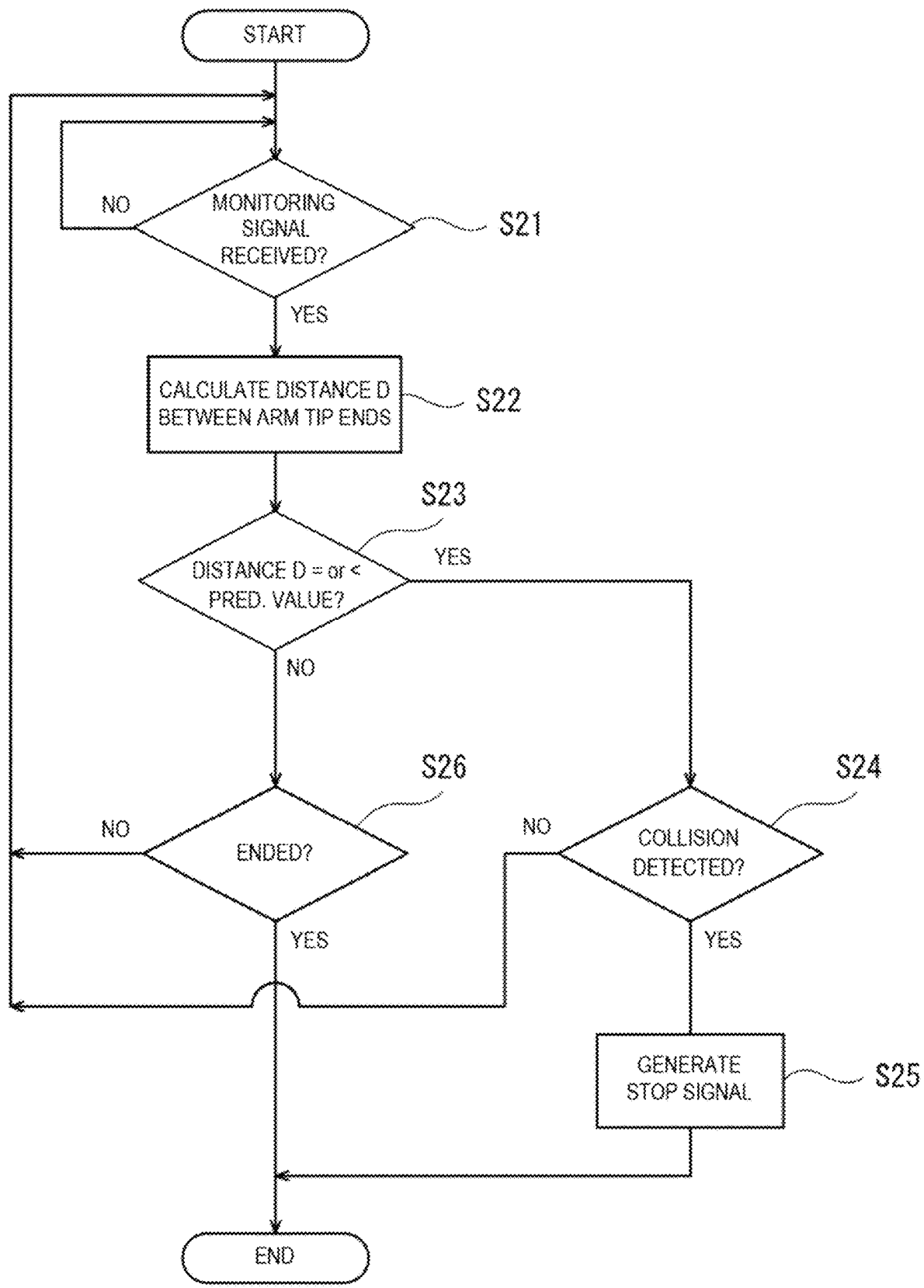
FIG. 7 is a flowchart illustrating one example of a monitoring operation of a robot.

As illustrated in FIG. 7, if the distance D is equal to or less than the predetermined value (YES at Step S23 in FIG. 7), the force monitoring module 49 detects the collision based on the first monitoring criterion on the basis of the external force detected by the external force detecting module 48 (Step S24 in FIG. 7). In detail, the force monitoring module 49 determines whether the external force value $|f_d|$ inputted from the external force detecting module 48 exceeds the first threshold $f_{th1}$ set in advance. If the external force value $|f_d|$ exceeds the first threshold $f_{th1}$, the force monitoring module 49 determines that the obstacle collides with the tip end of the robotic arm 2, and thus, generates the collision detection signal and outputs it to the stop-signal generating module 46. As described above, when the distance monitoring module 42 determines that the obstacle (e.g., the worker) around the robot 1 may be caught between the tip ends of the arms 2, the force monitoring module 49 detects the collision based on the external force acting on the tip end of the arm.

Then, if the stop-signal generating module 46 receives the input of the collision detection signal from the force monitoring module 49 (YES at Step S24 in FIG. 7), the stop-signal generating module 46 generates the stop signal of the robot 1 (Step S25 in FIG. 7) and outputs it to the controlling device 3. Therefore, the controlling device 3 can stop the operation of the robot 1.

According to this exemplary embodiment, when the object therearound may be caught between the tip ends of the arms 2, the collision can be detected based on the external force acting on the tip ends of the arms 2, and the operation of the robot 1 can be stopped when the collision is detected. Therefore, the safety of the worker can be improved.

Next, a modification of the force monitoring function of this embodiment is described. In this modification, the collision is detected based on two different monitoring criteria according to the distance D. In detail, if the distance D calculated by the distance calculating module 41 is greater than a predetermined value, the force monitoring module 49 in FIG. 6 detects the collision based on the first monitoring criterion on the basis of the external force detected by the external force detecting module 48. In detail, the force monitoring module 49 determines whether the external force value $|f_d|$ inputted from the external force detecting module 48 exceeds the first threshold $f_{th1}$ set in advance. If the external force value $|f_d|$ exceeds the first threshold $f_{th1}$, the force monitoring module 49 determines that the obstacle collides with the tip end of the robotic arm 2, and thus, generates the collision detection signal and outputs it to the stop-signal generating module 46. In this modification, the first threshold $f_{th1}$ is set to 100N. The external force value $|f_d|$, which is the value compared with the first threshold $f_{th1}$, is a scalar value of the external force $f_d$.

On the other hand, if the distance D calculated by the distance calculating module 41 is equal to or less than the predetermined value, the force monitoring module 49 detects the collision based on a second monitoring criterion different from the first criterion, on the basis of the external force detected by the external force detecting module 48. In detail, the force monitoring module 49 calculates the value $f'_d$, which is proportional to the derivative of the external force value $f_d$ inputted from the external force detecting module 48, as the impact force acting on the tip end of the robotic arm 2, and determines whether the impact force value $|f'_d|$ acting on the tip end of the robotic arm 2 exceeds a second threshold $f_{th2}$ set in advance. If the impact force value $|f'_d|$ exceeds the second threshold $f_{th2}$, the force monitoring module 49 determines that the obstacle collides with the tip end of the robotic arm 2, and thus, generates the collision detection signal and outputs it to the stop-signal generating module 46. The impact force value $|f'_d|$, which is the value compared with the second threshold $f_{th2}$, is a scalar value of the external force $f'_d$.

Figure 8:
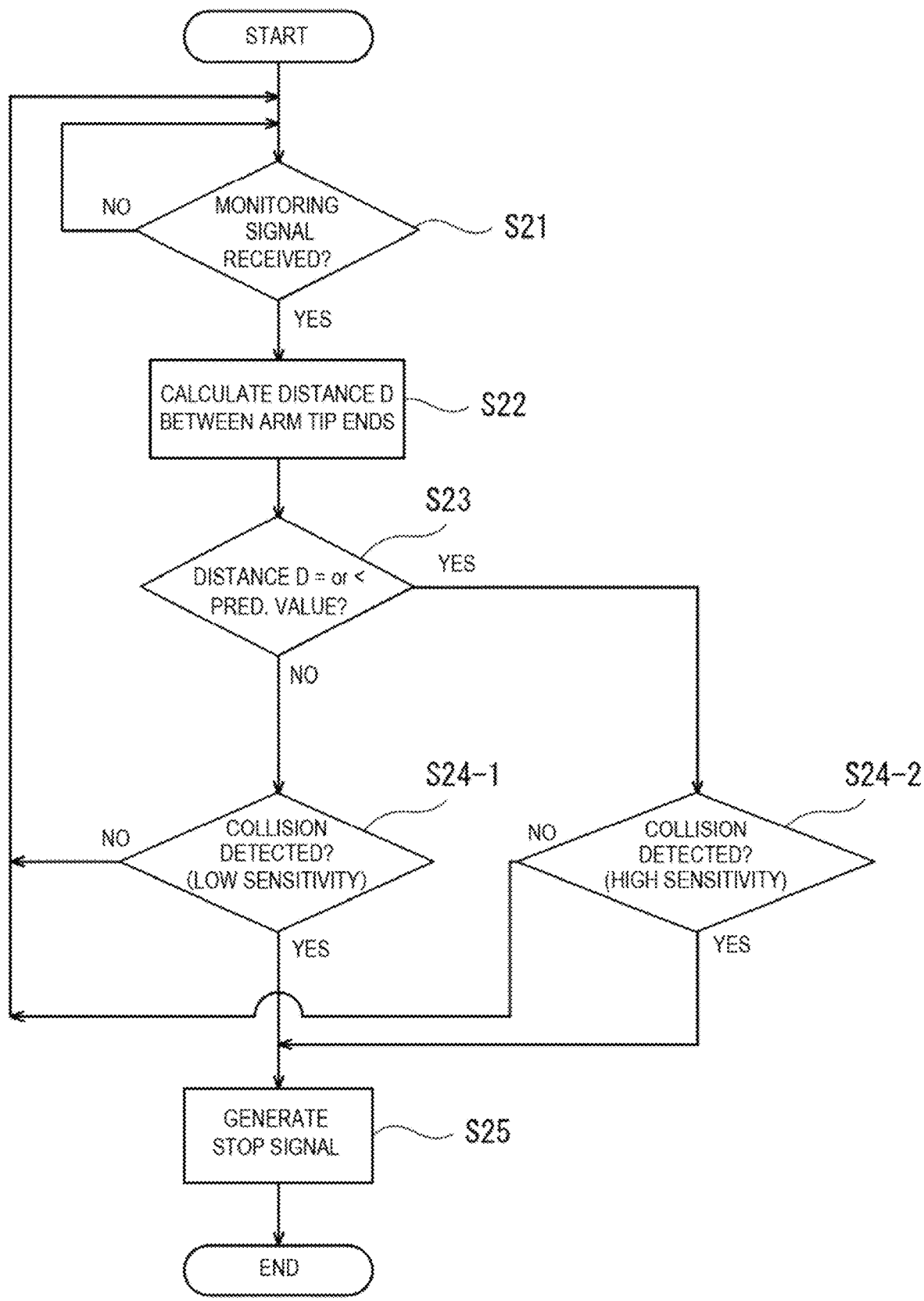
FIG. 8 is a flowchart illustrating a modification of the monitoring operation illustrated in FIG. 7.

FIG. 8 is a flowchart illustrating the monitoring operation in this modification. As illustrated in FIG. 8, if the distance D exceeds the predetermined value (NO at Step S23 in FIG. 8), the force monitoring module 49 detects the collision based on the first monitoring criterion on the basis of the external force detected by the external force detecting module 48 (Step S24-1 in FIG. 8). In detail, the force monitoring module 49 determines whether the external force value $|f_d|$ inputted from the external force detecting module 48 exceeds the first threshold $f_{th1}$ set in advance. If the external force value $|f_d|$ exceeds the first threshold $f_{th1}$, the force monitoring module 49 determines that the robot 1 collides, and thus, generates the collision detection signal and outputs it to the stop-signal generating module 46. As described above, when the distance monitoring module 42 determines that there is no possibility that the obstacle (e.g., the worker) around the robot 1 is caught between the tip ends of the arms 2, the force monitoring module 49 sets a lower sensitivity to the collision so as to detect the collision.

On the other hand, if the distance D is equal to or less than the predetermined value (YES at Step S23 in FIG. 8), the force monitoring module 49 detects the collision based on the second monitoring criterion different from the first criterion, on the basis of the external force detected by the external force detecting module 48 (Step S24-2 in FIG. 8). In detail, the force monitoring module 49 calculates the value $f'_d$, which is proportional to the derivative of the external force value $f_d$ inputted from the external force detecting module 48, as the impact force acting on the tip end of the robotic arm 2, and determines whether the impact force value $|f'_d|$ acting on the tip end of the robotic arm 2 exceeds the second threshold $f_{th2}$ set in advance. If the impact force value $|f'_d|$ exceeds the second threshold $f_{th2}$, the force monitoring module 49 determines that the obstacle collides with the tip end of the robotic arm 2, and thus, generates the collision detection signal and outputs it to the stop-signal generating module 46. As described above, when the distance monitoring module 42 determines that the obstacle (e.g., the worker) around the robot 1 may be caught between the tip ends of the arms 2, the force monitoring module 49 sets a higher collision sensitivity to detect the collision.

Then, when the stop-signal generating module 46 receives the input of the collision detection signal from the force monitoring module 49, the stop-signal generating module 46 generates the stop signal of the robot 1 (Step S25 in FIG. 8) and outputs it to the controlling device 3. Therefore, the controlling device 3 can stop the operation of the robot 1.

According to this modification, when there is no possibility that the object therearound is caught between the tip ends of the two arms 2, the collision is detected based on the first monitoring criterion (at the lower collision sensitivity). On the other hand, when the object therearound may be caught between the tip ends of the two arms 2, the collision is detected based on the second monitoring criterion (at the higher collision sensitivity). That is, since the collision sensitivity can be changed according to the gap between the tip ends of the two arms 2, both of the workability of the robot and the safety of the worker can be achieved.

Note that, although in this embodiment the operation of the robot is stopped after the collision is detected, the detected collision may be notified to the worker around the robot or the administrator.

Moreover, although the monitoring device 4A according to this embodiment has the force monitoring function to detect the collision based on the external force acting on the robotic arms 2 according to the distance D, the force monitoring function may be combined with the speed monitoring function described earlier.

In this exemplary embodiment, since the external force acting on the tip end of the robotic arm 2 is calculated based on the current value of the servomotor without using a force sensor, the collision can be detected accurately at a low cost. Therefore, the cooperative work of the robot and the worker therearound can further be convenient.

Although in the embodiments described above the distance calculating module 41 calculates the positions of the tip ends of arms 2 based on the rotational angular positions of the servomotors M (the detection signals of the position sensors E) and the information on the lengths and shapes of the links, respectively, so as to calculate the distance D between the tip ends of the arms 2, it is not limited to this. For example, distance sensors may be attached to the tip ends of the arms 2, respectively, so that the distance D between the tip ends of the arms 2 is calculated based on the detection values of the distance sensors.

Note that although in the embodiments the positions of the tip ends of the arms 2 are the tool center points TP of the end effectors 19, respectively, and the distance D is the distance between the tool center points TP of the end effectors 19 (see FIG. 2), it is not limited to this. The position of the tip end of the arm 2 may be an arbitrary point other than the tool center point. The position of the tip end of the arm 2 may be an arbitrary point (e.g., an origin) in a flange coordinate system, which is defined on a flange provided to the tip end of the arm.

Note that although the robot 1 in the embodiments described above is the dual-arm robot provided with the horizontally articulated arms, it may be a dual-arm robot provided with vertically articulated arms.

Note that although the robot 1 in the embodiments is one dual-arm robot provided with the two arms 2, it is not limited to this, as long as the robot can define a distance between tip ends of their arms. For example, a distance between tip ends of arms of two single-arm robots may be monitored, or a distance between tip ends of at least two arms in a robot system including three or more robotic arms may be monitored.

Note that although in the embodiments the monitoring devices 4 and 4A are each provided separately from the controlling device 3, they may be included in the controlling device 3. For example, each functional block of the monitoring device 4 may be implemented by the processor 6 of the controlling device 3.

According to the present disclosure, the controlling device suitable for a robot which works cooperatively with a human can be provided.

It is apparent for a person skilled in the art that many improvements and other embodiments of the present disclosure are possible from the above description. Therefore, the above description is to be interpreted only as illustration, and it is provided in order to teach a person skilled in the art the best mode for implementing the present disclosure. The details of the structures and/or the functions may be substantially changed, without departing from the spirit of the present disclosure.

INDUSTRIAL APPLICABILITY

The present disclosure is useful for a robot working with a human in the same workspace.

DESCRIPTION OF REFERENCE CHARACTERS

1 Robot
2 Robotic Arm
3 Controlling Device
4, 4A Monitoring Device
5 Current Sensor
6 Processor
7 Servo Amplifier
8 Carriage
9 Base
17 Wrist Part
18 Mechanical Interface
19 End Effector
20 Arm Part
20a First Link
20b Second Link
41 Distance Calculating Module
42 Distance Monitoring Module
43 Speed-Regulation-Value Generating Module
44 Speed Calculating Module
45 Speed Monitoring Module
46 Stop-Signal Generating Module
47 Drive Torque Estimating Module
48 External Force Detecting Module
49 Force Monitoring Module 61 Current-Command-Value Generating Module
62 Speed-Regulation-Value Setting Module
100 Work Bench
J Joint
M Servomotor
E Encoder (Position Sensor)
C Cable
TP Tool Center Point
D Distance Between Tip Ends of Arms

What is claimed is:

1. Circuitry configured to control operation of a robot having a first robotic arm and a second robotic arm, the circuitry comprising:
a distance calculator configured to calculate a distance between a tip end of the first robotic arm and a tip end of the second robotic arm;
a distance monitor configured to monitor whether the distance calculated by the distance calculator is equal to or less than a predetermined value,
wherein each of the first robotic arm and the second robotic arm have a plurality of joints, and each joint of each of the first robotic arm and the second robotic arm is inhibited from exceeding a predetermined speed, when the distance calculated by the distance calculator is equal to or less than the predetermined value; and
a speed monitor configured to monitor whether operating speeds of the first robotic arm and the second robotic arm exceed the predetermined speed, when the distance calculated by the distance calculator is equal to or less than the predetermined value,
wherein the circuitry stops the operations of the first robotic arm and the second robotic arm when the operating speed exceeds the predetermined speed, and
wherein after the predetermined speed is set, the predetermined speed is maintained through all future movements of the first robotic arm and the second robotic arm, and wherein the predetermined speed is a lower speed than a normal speed.

2. The circuitry of claim 1, further comprising:
an external force detector configured to detect external forces acting on the tip end of the first robotic arm and the tip end of the second robotic arm; and
a force monitor configured to detect a collision based on a predetermined monitoring criterion, on a basis of the external forces detected by the external force detector, when the distance calculated by the distance calculator is equal to or less than the predetermined value,
wherein when the collision is detected, the circuitry stops the operations of the first robotic arm and the second robotic arm.

3. The circuitry of claim 1, further comprising:
an external force detector configured to detect external forces acting on the tip end of the first robotic arm and the tip end of the second robotic arm; and
a force monitor configured to detect a collision based on a predetermined monitoring criterion, on a basis of the external forces detected by the external force detector, when the distance calculated by the distance calculator is equal to or less than the predetermined value,
wherein when the collision is detected, the circuitry stops the operations of the first robotic arm and the second robotic arm.

4. The circuitry of claim 1, further comprising:
an external force detector configured to detect external forces acting on the tip end of the first robotic arm and the tip end of the second robotic arm; and
a force monitor configured to detect a collision based on a first monitoring criterion, on a basis of the external forces detected by the external force detector, when the distance calculated by the distance calculator is greater than the predetermined value, and detect a collision based on a second monitoring criterion different from the first criterion, on a basis of the external forces detected by the external force detector, when the distance calculated by the distance calculator is equal to or less than the predetermined value,
wherein when the collision is detected, the circuitry stops the operations of the first robotic arm and the second robotic arm.

5. The circuitry of claim 1, further comprising:
an external force detector configured to detect external forces acting on the tip end of the first robotic arm and the tip end of the second robotic arm; and
a force monitor configured to detect a collision based on a first monitoring criterion, on a basis of the external forces detected by the external force detector, when the distance calculated by the distance calculator is greater than the predetermined value, and detect a collision based on a second monitoring criterion different from the first criterion, on a basis of the external forces detected by the external force detector, when the distance calculated by the distance calculator is equal to or less than the predetermined value,
wherein when the collision is detected, the circuitry stops the operations of the first robotic arm and the second robotic arm.

6. The circuitry of claim 2, further comprising:
the force monitor configured to detect a collision based on a first monitoring criterion, on a basis of the external forces detected by the external force detector, when the distance calculated by the distance calculator is greater than the predetermined value, and detect a collision based on a second monitoring criterion different from the first criterion, on a basis of the external forces detected by the external force detector, when the distance calculated by the distance calculator is equal to or less than the predetermined value,
wherein when the collision is detected, the circuitry stops the operations of the first robotic arm and the second robotic arm.

7. The circuitry of claim 1, wherein the first robotic arm and the second robotic arm are provided so as to be rotatable coaxially with and independently from each other.

8. The circuitry of claim 1, wherein the first robotic arm and the second robotic arm are provided so as to be rotatable coaxially with and independently from each other.

9. The circuitry of claim 2, wherein the first robotic arm and the second robotic arm are provided so as to be rotatable coaxially with and independently from each other.

10. The circuitry of claim 4, wherein the first robotic arm and the second robotic arm are provided so as to be rotatable coaxially with and independently from each other.

11. The circuitry of claim 1, wherein a position of the tip end of the first robotic arm is a tool center point of the first robotic arm, and a position of the tip end of the second robotic arm is a tool center point of the second robotic arm, and
wherein the distance calculator calculates a distance between the tool center point of the first robotic arm and the tool center point of the second robotic arm.

12. The circuitry of claim 1, wherein a position of the tip end of the first robotic arm is a tool center point of the first robotic arm, and a position of the tip end of the second robotic arm is a tool center point of the second robotic arm, and wherein the distance calculator calculates a distance between the tool center point of the first robotic arm and the tool center point of the second robotic arm.

13. The circuitry of claim 2, wherein a position of the tip end of the first robotic arm is a tool center point of the first robotic arm, and a position of the tip end of the second robotic arm is a tool center point of the second robotic arm, and wherein the distance calculator calculates a distance between the tool center point of the first robotic arm and the tool center point of the second robotic arm.

14. Circuitry configured to control operation of a robot having a first robotic arm and a second robotic arm, the circuitry comprising:

means for calculating a distance between a tip end of the first robotic arm and a tip end of the second robotic arm; and means for monitoring whether the distance calculated by the means for calculating is equal to or less than a predetermined value, wherein each of the first robotic arm and the second robotic arm have a plurality of joints, and each joint of each of the first robotic arm and the second robotic arm is inhibited from exceeding a predetermined speed, when the distance calculated by the means for calculating is equal to or less than the predetermined value; and a second means for monitoring whether operating speeds of the first robotic arm and the second robotic arm exceed the predetermined speed, when the distance calculated by the means for calculating is equal to or less than the predetermined value, wherein the circuitry stops the operations of the first robotic arm and the second robotic arm when the operating speed exceeds the predetermined speed, and wherein after the predetermined speed is set, the predetermined speed is maintained through all future movements of the first robotic arm and the second robotic arm, and wherein the predetermined speed is a lower speed than a normal speed.

* * * * *